(12) United States Patent
Dhanakshirur

(10) Patent No.: US 8,929,519 B2
(45) Date of Patent: *Jan. 6, 2015

(54) ANALYZING SPEECH APPLICATION PERFORMANCE

(71) Applicant: International Business Machines Corporation, Armonk, NY (US)

(72) Inventor: Girish Dhanakshirur, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/138,512

(22) Filed: Dec. 23, 2013

(65) Prior Publication Data

US 2014/0112461 A1 Apr. 24, 2014

Related U.S. Application Data

(63) Continuation of application No. 11/534,309, filed on Sep. 22, 2006, now Pat. No. 8,666,040.

(51) Int. Cl.
*H04M 11/00* (2006.01)
*G10L 15/01* (2013.01)
*H04M 3/22* (2006.01)
*H04M 3/493* (2006.01)

(52) U.S. Cl.
CPC .......... *G10L 15/01* (2013.01); *H04M 3/2227* (2013.01); *H04M 3/493* (2013.01)
USPC ........................................ 379/88.18; 379/72

(58) Field of Classification Search
CPC ..... H04M 3/382; H04M 3/487; H04M 3/493; H04M 3/527; H04M 3/533; H04M 3/4872; H04M 3/5166; H04M 3/42204; H04M 3/53325; H04M 3/53333; H04M 7/006; H04M 2201/40
USPC .................................................. 379/72, 88.18
See application file for complete search history.

(56) References Cited

U.S. PATENT DOCUMENTS

| | | |
|---|---|---|
| 5,623,540 A | 4/1997 | Morrison et al. |
| 5,696,809 A | 12/1997 | Voit |
| 5,802,526 A | 9/1998 | Fawcett et al. |
| 5,825,869 A | 10/1998 | Brooks et al. |
| 5,903,641 A | 5/1999 | Tonisson |
| 5,963,635 A | 10/1999 | Szlam et al. |
| 5,970,065 A | 10/1999 | Miloslavsky |
| 5,970,468 A | 10/1999 | Bull |

(Continued)

FOREIGN PATENT DOCUMENTS

WO 2004099934 A2 11/2004

*Primary Examiner* — Simon Sing
(74) *Attorney, Agent, or Firm* — Cuenot, Forsythe & Kim, LLC

(57) ABSTRACT

A method of analyzing speech application performance can include determining a call path for each of a plurality of calls from a log of an interactive voice response system having a speech application. Each call path can be defined by an ordered set of dialog nodes of the speech application. A number of occurrences of at least one selected type of event for the dialog nodes of the plurality of calls can be counted. At least one call path from the plurality of call paths can be indicated according, at least in part, to the number of occurrences of the selected type of event within the at least one indicated call path.

16 Claims, 3 Drawing Sheets

(56) References Cited

U.S. PATENT DOCUMENTS

| | | |
|---|---|---|
| 6,459,788 B1 | 10/2002 | Khuc et al. |
| 6,487,277 B2 | 11/2002 | Beyda et al. |
| 6,694,001 B1 | 2/2004 | Lampell et al. |
| 6,697,457 B2 | 2/2004 | Petrushin |
| 6,721,416 B1 | 4/2004 | Farrell |
| 6,731,744 B1 | 5/2004 | Khuc et al. |
| 6,763,104 B1 | 7/2004 | Judkins et al. |
| 6,823,054 B1* | 11/2004 | Suhm et al. .................. 379/134 |
| 6,904,143 B1 | 6/2005 | Peterson et al. |
| 6,970,554 B1 | 11/2005 | Peterson et al. |
| 7,321,298 B2 | 1/2008 | Judkins et al. |
| 7,366,293 B2 | 4/2008 | Ezerzer et al. |
| 7,386,102 B2 | 6/2008 | Summe et al. |
| 7,401,320 B2 | 7/2008 | Brunet et al. |
| 7,573,990 B2* | 8/2009 | Galvin .................... 379/112.06 |
| 7,962,644 B1 | 6/2011 | Ezerzer et al. |
| 2002/0013705 A1 | 1/2002 | Jaepel et al. |
| 2002/0067821 A1 | 6/2002 | Benson et al. |
| 2002/0169606 A1 | 11/2002 | Bantz et al. |
| 2003/0035532 A1 | 2/2003 | Ganesan et al. |
| 2004/0225499 A1 | 11/2004 | Wang et al. |
| 2005/0002502 A1 | 1/2005 | Cloran |
| 2005/0010411 A1 | 1/2005 | Rigazio et al. |
| 2005/0055209 A1 | 3/2005 | Epstein et al. |
| 2008/0084971 A1 | 4/2008 | Dhanakshirur |

* cited by examiner

ANALYZING SPEECH APPLICATION PERFORMANCE

CROSS-REFERENCE TO RELATED APPLICATIONS

This application is a Continuation of U.S. application Ser. No. 11/534,309, filed on Sep. 22, 2006.

BACKGROUND OF THE INVENTION

Interactive Voice Response (IVR) systems enable a user to interact with various applications and/or systems using a combination of voice and touch-tone responses. In general, an IVR system can include a speech recognition system, a text-to-speech system, and a speech application. The speech application generally dictates the order and circumstances, i.e., in response to which user inputs, in which various dialogs are presented to the user. A dialog can refer to a menu which, when rendered by the IVR system, provides the turn-taking cues or prompts needed to cause the user to speak and provide the IVR system with the information needed to route a call. The speech application specifies the program logic which regulates the call flow.

In the typical case, a user places a call that is answered by an IVR system. The IVR system launches the speech application, which begins prompting the user and obtaining user responses. This exchange can continue until the session with the IVR system terminates successfully or unsuccessfully. A successful IVR session, for example, can be one in which the user obtains desired information from interacting with the IVR system. Another example of a successful IVR session can be one in which the user's call reaches the correct termination point, i.e., a desired person. An unsuccessful IVR session can include cases in which the user is unable to obtain desired information and hangs up in frustration. Another example of an unsuccessful IVR session is one in which the IVR system cannot determine the user's wishes and transfers the call to a human agent or operator for handling.

A high number of unsuccessful IVR sessions or calls can indicate that an IVR system is difficult to use or navigate. Often, unsuccessful IVR sessions are indicative of some problem with the speech application. In any case, a large number of calls ending in user frustration or calls that too frequently are referred to an agent can produce negative user sentiment toward a business or organization. This not only can tarnish the public image of an organization, but also can significantly hamper the ability of the organization to service its clients.

BRIEF SUMMARY OF THE INVENTION

The present invention provides method(s) and apparatus relating to speech application evaluation and performance. One embodiment of the present invention can include a method of analyzing speech application performance. The method can include determining a call path for each of a plurality of calls from a log of an interactive voice response (IVR) system having a speech application. Each call path can be defined by an ordered set of dialog nodes of the speech application. A number of occurrences of at least one selected type of event for the dialog nodes of the plurality of calls can be counted. At least one call path from the plurality of call paths can be indicated according, at least in part, to the number of occurrences of the selected type of event within the at least one indicated call path.

Another embodiment of the present invention can include a method of analyzing speech application performance including determining a call path for each of a plurality of calls listed within a log of an IVR system having a speech application, wherein each call path is defined by an ordered set of dialog nodes of the speech application, and determining a number of occurrences of at least one selected type of event at each dialog node of a call path for each of the plurality of calls. The method also can include identifying call paths of the plurality of calls that correspond to search criteria specifying, at least in part, a number of occurrences of the selected type of event and presenting a graphic illustration of an identified call path.

Yet another embodiment of the present invention can include a machine readable storage being programmed to cause a machine to perform the various steps and/or functions described herein.

DETAILED DESCRIPTION OF THE INVENTION

Figure 1:
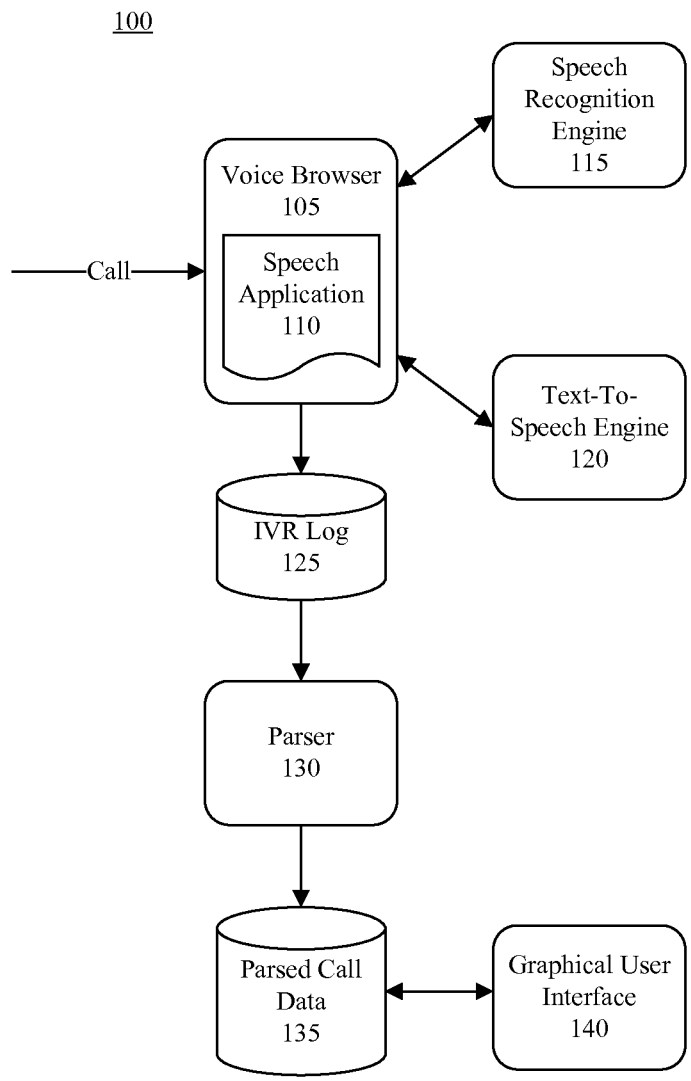
FIG. 1 is a schematic diagram illustrating an IVR system which is useful for understanding the embodiments disclosed herein.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to speech applications and, more particularly, to analyzing the performance of a speech application. The embodiments can be utilized, for example, in the context of an interactive voice response (IVR) system executing a voice application. The IVR system, for example, may be disposed within a call center. Regardless of the location and particular implementation of the speech application, it is useful to determine whether the speech application is able to effectively communicate with users or callers.

In accordance with the inventive arrangements, a log of an IVR system can be parsed and analyzed to determine the call path for each of a plurality of calls. The occurrence of selected event types can be counted for different nodes of the call paths. Based upon the determined call paths and the events identified at various nodes of those call paths, one or more calls can be graphically illustrated to a developer, for example, in response to a developer query of the processed IVR log. By viewing call paths in this manner, context is provided to aid the developer is diagnosing problematic nodes or paths within the speech application.

FIG. 1 is a schematic diagram illustrating an IVR system 100 which is useful for understanding the embodiments disclosed herein. As shown, the IVR system 100 can include a voice browser 105, a speech recognition engine (SRE) 115, a text-to-speech (TTS) engine 120, and an IVR log 125. In one embodiment, the IVR system 100 can be implemented as WebSphere Voice Server, which is commercially available from International Business Machines Corporation of Armonk, N.Y.

The voice browser 105 can execute various speech applications 110 coded in a suitable markup language such as Voice Extensible Markup Language (VoiceXML). Other markup languages, such as Speech Application Language Tags (SALT), can be used depending upon the particular implementation of the IVR system 100 or voice browser 105 that is used. It should be appreciated, however, that the use of a particular markup language for coding the speech application 110 is not intended to limit the present invention. The SRE 115 can convert user spoken utterances to text as well as recognize dual tone multi-frequency input. The TTS system 120 can convert text to speech or audio.

The voice browser 105 can receive incoming calls, whether originating from the Public Switched Telephone Network (PSTN) or landline, a mobile network, or a Voice-Over-Internet (VoIP) connection, and launch the appropriate speech application 110, for example, based upon the dialed number. The speech application 110 determines which dialogs are presented to the user at a given time and under what circumstances. Thus, the TTS engine 120 can play various prompts to the user under the control of the speech application 110 executing within the voice browser 105.

As user spoken utterances are received by the speech application 110, the speech application 110 can provide the audio, i.e., user spoken utterances or input, to the SRE 115 for recognition. Recognition results can be provided back to the voice browser 105 and/or speech application 110. The SRE 115 also can provide other information back to the voice browser 105 and/or speech application 110 which can include one or more events indicating the status of the recognition results or other conditions that occurred while processing audio provided to the SRE 115.

In illustration, the SRE 115 can send back events detailing the confidence score of a particular recognition result, whether the audio was recognized at all, or the like. If, for example, the SRE 115 determines that the user uttered a phrase that was not in the active grammar of the SRE 115, a "no match" event can be returned to the voice browser 105 and/or speech application 110. If the SRE 115 was unable to convert the user spoken utterance to text, the SRE 115 can return an event indicating that the user spoken utterance was not understood. Still another example can be where the SRE 115 does not detect any user spoken utterance to process, in which case an event indicating that no input was received by the SRE 115 can be provided back to the voice browser 105 and/or speech application 110. In any case, the speech application 110 can use these results to determine the next dialog to be presented to the caller, i.e., determine call flow.

The information generated by the SRE 115, the TTS 120, the voice browser 105, and/or the speech application 110 can be recorded within the IVR log 125. Within the IVR log 125, a record can be created for each call. Each record can be indicated by an identifier that uniquely identifies the call. For example, information that can be specified by a record can include, but is not limited to, date and time information for the beginning and end of a call as well as for various points during the call, i.e., when different dialogs are presented to the user. Each call record further can specify the dialogs that were presented to the user as determined by the speech application 110, the order of such dialogs, the events that were generated from the SRE 115 for processing user inputs responding to such dialogs, events generated by the TTS 120, digitized audio recording of actual user spoken utterances (inputs), and the like.

In accordance with the inventive arrangements disclosed herein, the IVR log 125 can be analyzed by the parser 130 to determine those areas or dialog nodes, within the different call paths that indicate a problem. As used herein, a dialog node can refer to a dialog or menu. Thus, each call handled by the IVR system 100 and for which a record is created within the IVR log 125 can be characterized as an ordered series of dialog nodes, where each node indicates the particular dialog that was presented to the user, user responses, as well as different events that may have been generated by the different components of the IVR system 100 at that dialog node.

The operation of the parser 130 will be described in further detail with reference to FIG. 2. In general, however, the parser 130 can generate parsed call data 135, which can be presented to the user via the graphical user interface (GUI) 140. The GUI 140 also can provide mechanisms through which a user can query the parsed call data 135 as well as functions for graphically rendering one or more of the call paths that are identified as matching or corresponding to user specified criteria of a query.

It should be appreciated that the IVR system 100 has been presented for purposes of illustration only and is not intended to limit the present invention to one particular IVR system or speech application configuration. As such, any of a variety of different types of IVR systems can be used with the embodiments disclosed herein so long as a record of calls is maintained and such record includes data which, at least in part, approximates the call data described herein.

Figure 2:
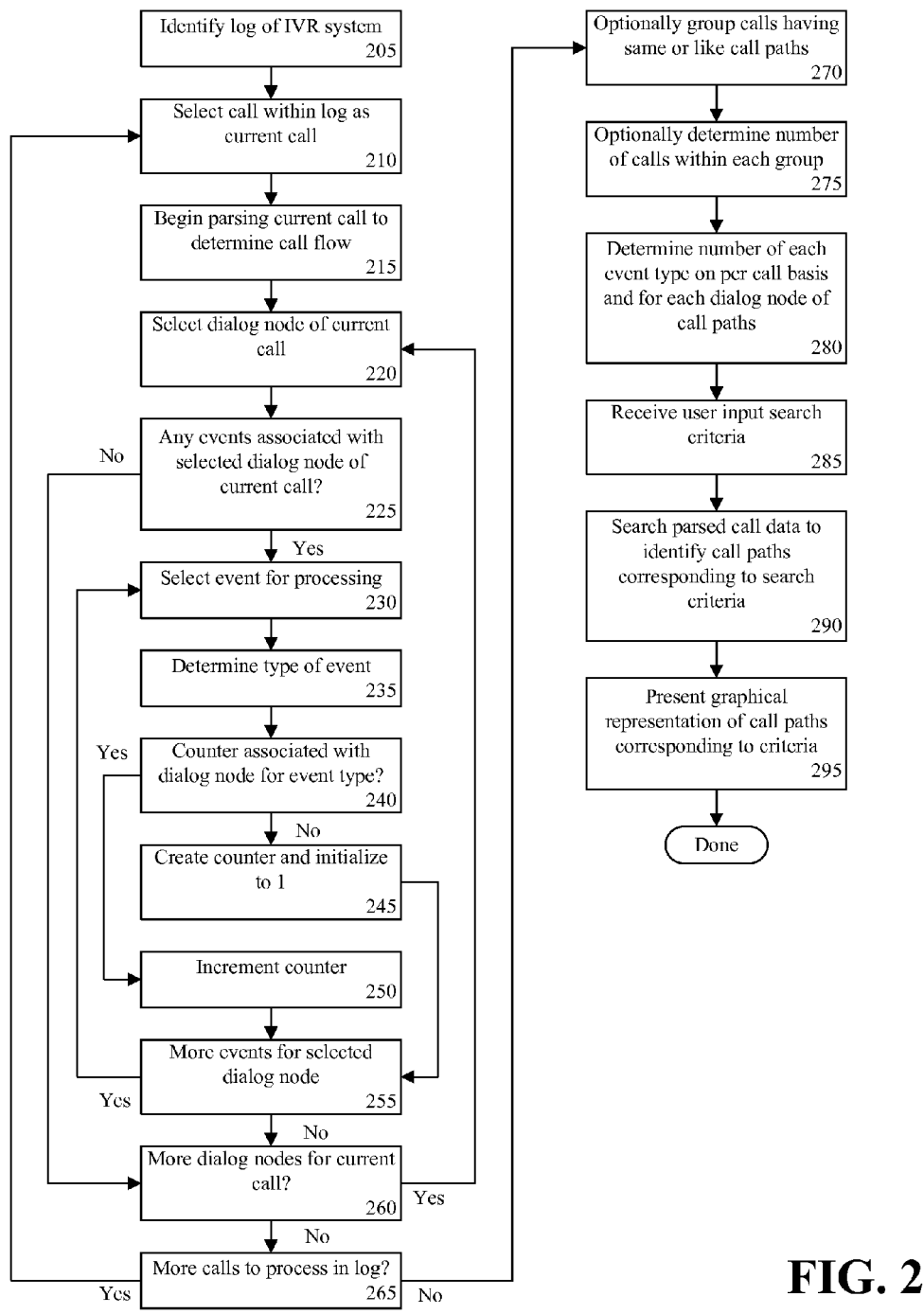
FIG. 2 is a flow chart illustrating a method of analyzing a speech application in accordance with one embodiment of the present invention.

FIG. 2 is a flow chart illustrating a method 200 of analyzing the performance of a speech application in accordance with one embodiment of the present invention. The method 200 can begin in a state where an IVR system has been operating and handling a plurality of calls. The IVR system can maintain a log, as described, which can be evaluated to identify problems in how the speech application handles calls.

In step 205, the parser can identify the IVR log. In step 210, the parser can select a call, in this case a first call, from the IVR log as the current call for processing. As noted, each call within the IVR log can be indicated by a unique identifier. This identifier can be used to identify the call within the parsed data and further can be used as an indicator of the call path that is generated for the current call by the parser. The parser can generate a call path for each call.

In step 215, the parser can begin parsing the call data for the currently selected call to determine the call path. In step 220, the parser can select the first dialog node of the current call. As noted, a dialog node, within the speech application, refers to the state of the speech application and specifies the particular dialog that has been presented to a caller. The first dialog node typically is a greeting or welcome dialog. After the caller makes an initial selection, the path of the call can branch to other dialog nodes depending upon the caller's response.

In step 225, the parser can determine whether an event has been recorded that is associated with the current dialog node as specified within the IVR log. If so, the method can proceed to step 230. If not, the method can proceed to step 260. Continuing with step 230, the identified event can be selected for processing. In step 235, the type of the event can be identified. Event types can include, but are not limited to, "no match" events, "no input" events, "phrase not in active grammar" events, confidence score related events, call transferred to agent events, call terminated events, and the like.

In step 240, a determination can be made as to whether a counter has been associated with the event type identified in step 235 for the currently selected dialog node. For example, if the parser identified the event selected in step 230 as a "no match" event, the parser can determine whether a counter has been created for the current dialog node of the current call for "no match" events. If a counter does not already exist for the event type identified in step 235, the method can proceed to step 245 where a counter is created and initialized to a count of one. If a counter already exists for the event type identified in step 235, the method can proceed to step 250, where that counter can be incremented.

Proceeding to step 255, a determination can be made as to whether any other events that have not yet been processed are associated with the currently selected dialog node. If so, the method can loop back to step 230 to select a next event to be processed for the current dialog node. If not, the method can proceed to step 260. It should be appreciated that although each event associated with a dialog node can be evaluated, in another embodiment, developers can specify one or more selected event types that will be detected by the parser. In that case, event types that are not specified, or otherwise enumerated to the parser, can be ignored. It further should be appreciated that the tracking of event types can be performed on a per dialog node basis. That is, each dialog node of the call path can be associated with, or include, one or more counters, where each counter is dedicated to a particular event type.

Continuing with step 260, a determination can be made as to whether any additional dialog nodes exist which have not been parsed for the current call. If so, the method can loop back to step 220 where a next dialog node for the current call can be selected and the analysis can continue. If no further dialog nodes remain to be processed for the current call, the method can proceed to step 265. In step 265, a determination can be made as to whether any further calls remain to be processed from the IVR log. If so, the method can loop back to step 210 to select a next call to be parsed. If not, the method can proceed to step 270.

Steps 270-290 illustrate various ways in which the parsed IVR log data, or call paths, can be queried. In step 270, for example, like or same call paths can be associated with one another or grouped. In step 275, the number of call paths within each respective group determined in step 270 can be counted or determined. In step 280, the number of total events of each event type can be determined for each call or call path as the case may be. It should be appreciated that the call path data can be processed or analyzed in any of a variety of different ways and that the examples disclosed herein have been provided for purposes of illustration.

In step 285, a user input specifying search criteria can be received. The search criteria can specify any of a variety of different parameters for which the call paths will be searched. In illustration, possible queries can look for call paths having a predetermined number of "no input" events in a row, occurring at a particular dialog node, or after a particular dialog node sequence. A user can query to identify call paths in which the user was re-prompted a minimum number of times, whether in total for the call path or at selected dialog nodes. In general, queries can specify any combination of attributes that are parsed or counted from the IVR log including, but not limited to, order of dialog nodes, frequency or occurrence of particular events, occurrence or frequency of events at particular dialog nodes or after a particular sequence of dialog nodes, like call paths, etc.

In step 290, the parsed call data can be searched to identify any calls or call paths that correspond to the user-specified search criteria. In step 295, any call paths identified in step 290 can be indicated to the user. In one embodiment, the calls can be indicated through a time and/or date stamp. In another embodiment, the unique identifier for the call from the IVR log can be indicated. Dialog nodes of the call paths located further can be specified. In still another embodiment, graphic representations of the call paths, including various attributes of the call paths as determined via the parser, for example, can be presented.

In another embodiment, additional data can be manually added to the IVR log. For example, a developer can review the IVR log and, for each dialog node of a call, add a transcription of what was actually said by the user in response to the various prompts. What the user actually said then can be compared with the recognition result from the SRE. In another embodiment, the developer simply can add a parameter that indicates whether the recognition result from the SRE matches what the user actually said. In any case, this additional data allows the parser to recognize another type of event that indicates that what was recognized by the SRE does not match what the user actually said to the IVR system. Such events can be annotated in the call path for calls and counters can be used to count the occurrences of such events at each dialog node if desired.

Figure 3:
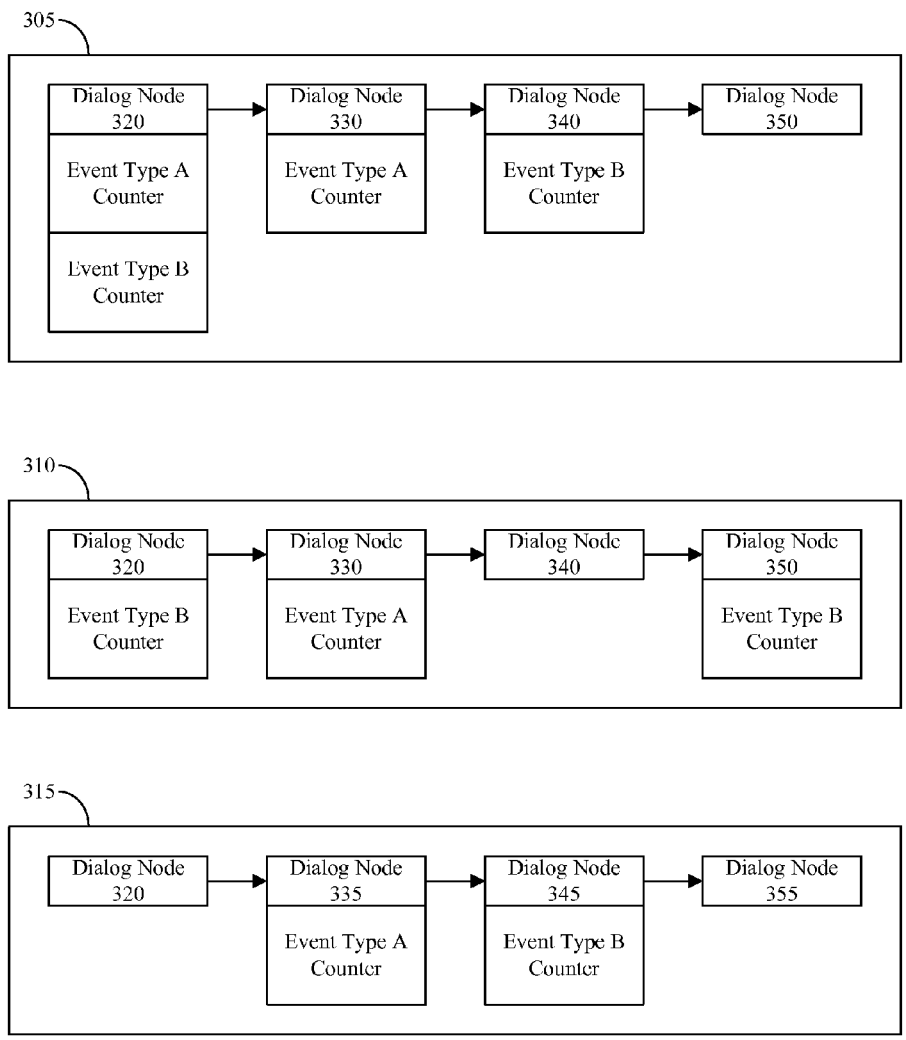
FIG. 3 is a block diagram illustrating call paths in accordance with another embodiment of the present invention.

FIG. 3 is a visual illustration of call paths in accordance with another embodiment of the present invention. More particularly, FIG. 3 depicts a call path for call 305, a call path for call 310, and a call path for call 315. As shown, each call path is formed of an ordered set of dialog nodes, representing the various menus that are presented to a user or caller, as the case may be, the order in which those menus were presented during each respective call.

Call 305 has a call path specified by dialog nodes 320, 330, 340, and 350, arranged in the order shown. Call path 310 has a call path also specified by the dialog nodes 320, 330, 340, and 350. Though the call paths for calls 305 and 310 are the same, i.e., the same menus were presented in the same order during the course of each call, each dialog node can specify different data. Dialog node 320 of call 305 is associated with event counters for event types A and B. Dialog node 320 for call 310, for example, is associated only with an event counter for event type B. The existence of counters for both event types A and B at dialog node 320 of call 305 indicate that both types of events occurred at dialog node 320 during call 305. The existence of only a counter for event type B at dialog node 320 of call 310 indicate that only event type B occurred at dialog node 320 of call 310. Despite specifying different types of data, the ordering of the dialog nodes can determine which call paths are the same. Call 305 and 310, for example, can be associated with one another or otherwise grouped as being a same call path.

Call 315 has a call path that is specified by dialog nodes 320, 335, 345, and 355. Thus, after the initial dialog was presented at the start of the call, as represented by dialog node 320, the user selected a different menu option than was selected by the caller in calls 305 and 310. In consequence, a different call path was formed. The call path of call 315 is different from those of calls 305 and 310 and would not be part of the same group. In any case, each of the dialog nodes of call 315 can specify various attributes, including, but not limited to, the different event type counters that have been associated with each respective dialog node of the call 315.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer hardware system configured to analyze speech application performance, comprising:
    at least one processor, wherein the at least one processor is configured to initiate and/or perform:
        identifying, from a log of an interactive voice response system including a speech application, a call path for each of a plurality of calls, each call path is defined by an ordered set of dialog nodes of the speech application;

counting a number of occurrences of at least one selected type of event for the dialog nodes of the plurality of call paths; and indicating at least one call path from the plurality of call paths according to the number of occurrences of the selected type of event within the at least one indicated call path.

2. The system of claim 1, wherein the at least one processor is configured to initiate and/or perform
presenting a graphic illustration of the at least one indicated call path.

3. The system of claim 1, wherein
for each node of a call path, the at least one processor is configured to initiate and/or perform:
determining whether the selected type of event occurred at a current dialog node;
creating and initializing a counter, associated with the current dialog node and the selected type of event, to a default value upon no counter for the selected type of event existing at the current dialog node; and
incrementing the counter upon the counter being associated with the selected type of event for the current dialog node.

4. The system of claim 1, wherein
the indicating includes selecting at least one call path from the plurality of call paths based upon the number of occurrences of the at least one type of event for a particular dialog node.

5. The system of claim 1, wherein the at least one processor is configured to initiate and/or perform
grouping calls having matching call paths.

6. The system of claim 5, wherein
a group of calls are indicated according to a measure of the number of occurrences of the selected type of event within the call paths of the group of calls.

7. The system of claim 5, wherein the at least one processor is configured to initiate and/or perform
determining the number of calls within each group of calls.

8. The system of claim 7, wherein
call paths of a group of calls are indicated based upon a measure of the number of calls within that group of calls.

9. The system of claim 1, wherein
the event type is selected to be a no match event.

10. The system of claim 1, wherein
the event type is selected to be a confidence score below a predetermined threshold.

11. The system of claim 1, wherein
the event type is selected to be a misrecognition event.

12. The system of claim 1, wherein
the event type is selected from the group consisting of:
a re-prompt event,
a hang-up event, and
an agent transfer event.

13. A computer hardware system configured to analyze speech application performance, comprising:
at least one processor, wherein the at least one processor is configured to initiate and/or perform:
identifying a call path for each of a plurality of calls listed within a log of an interactive voice response system having a speech application, each call path is defined by an ordered set of dialog nodes of the speech application;
determining a number of occurrences of a selected type of event at each dialog node of the call path for each of the plurality of calls;
identifying call paths of the plurality of calls that correspond to search criteria specifying a number of occurrences of the selected type of event; and
presenting a graphic illustration of an identified call path.

14. The system of claim 13, wherein
the identifying includes selecting at least one call path according to the number of occurrences of the selected type of event for a particular dialog node.

15. The system of claim 13, wherein the at least one processor is configured to initiate and/or perform
grouping calls having matching call paths.

16. The system of claim 15, wherein
the identifying includes selecting a group of calls according to a measure of the number of occurrences of the selected type of event within the call paths of the group of calls.

* * * * *